US011924336B1

(12) United States Patent
Khare et al.

(10) Patent No.: US 11,924,336 B1
(45) Date of Patent: Mar. 5, 2024

(54) CRYPTOGRAPHIC ARTIFACT GENERATION USING VIRTUALIZED SECURITY MODULES

(71) Applicant: Amazon Technologies, Inc., Seattle, WA (US)

(72) Inventors: Atul Khare, Sammamish, WA (US); Deepak Gupta, Portland, OR (US); Petre Eftime, Bucharest (RO); Madalin Razvan Nastase, Bucharest (RO)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 17/359,240

(22) Filed: Jun. 25, 2021

(51) Int. Cl.
*H04L 9/08* (2006.01)
*G06F 9/455* (2018.01)

(52) U.S. Cl.
CPC ........ *H04L 9/0861* (2013.01); *G06F 9/45558* (2013.01); *G06F 2009/45587* (2013.01)

(58) Field of Classification Search
CPC .............. H04L 9/0861; G06F 9/45558; G06F 2009/45587
USPC .......................................................... 713/171
See application file for complete search history.

(56) References Cited

U.S. PATENT DOCUMENTS

| | | | | |
|---|---|---|---|---|
| 7,984,304 B1 * | 7/2011 | Waldspurger | ......... | G06F 12/023 717/124 |
| 8,032,942 B2 * | 10/2011 | Smith | ..................... | G06F 21/57 726/28 |
| 8,074,262 B2 | 12/2011 | Scarlata | | |
| 8,249,257 B2 | 8/2012 | Brutch et al. | | |
| 8,259,948 B2 * | 9/2012 | Smith | ...................... | G06F 21/57 380/278 |
| 8,356,347 B2 * | 1/2013 | Berger | ..................... | G06F 21/57 726/16 |
| 8,453,236 B2 * | 5/2013 | Seifert | ..................... | G06F 21/57 726/22 |
| 8,549,288 B2 * | 10/2013 | Bade | ......................... | G06F 21/57 726/22 |
| 9,288,155 B2 * | 3/2016 | Uehara | ................. | H04L 63/105 |
| 9,501,665 B2 | 11/2016 | Scarlata | | |
| 10,303,879 B1 * | 5/2019 | Potlapally | ............... | G06F 21/57 |
| 2007/0094719 A1 * | 4/2007 | Scarlata | ................ | G06F 21/577 726/9 |

(Continued)

OTHER PUBLICATIONS

M Awais Javed; 5G Security Artifacts (DOS / DDOS and Authentication); IEEE:2017; pp. 127-133.*

*Primary Examiner* — Monjur Rahim
(74) *Attorney, Agent, or Firm* — Robert C. Kowert; Kowert, Hood, Munyon, Rankin & Goetzel, P.C.

(57) ABSTRACT

A pair of virtualized security device initialization data sets are received at a first virtualization server from respective sources prior to a launch of a compute instance at the server. A first virtualized security device is initialized using the data sets, and used to generate cryptographic artifacts used by the compute instance. A data item which was included in one of the data sets is modified after the cryptographic artifacts are generated. Additional cryptographic artifacts are generated by a second virtualized security device at a second virtualization server to which the compute instance has been migrated. The second virtualized security device is initialized using at least the modified data item.

20 Claims, 10 Drawing Sheets

(56) References Cited

U.S. PATENT DOCUMENTS

| | | | | |
|---|---|---|---|---|
| 2009/0154709 | A1* | 6/2009 | Ellison | H04L 9/083 380/282 |
| 2009/0169012 | A1* | 7/2009 | Smith | G06F 21/57 380/277 |
| 2009/0204964 | A1* | 8/2009 | Foley | G06F 21/53 718/1 |
| 2009/0282266 | A1* | 11/2009 | Fries | G06F 21/602 713/193 |
| 2012/0027213 | A1* | 2/2012 | Scarlata | H04L 67/10 380/283 |
| 2012/0059930 | A1* | 3/2012 | Devarakonda | H04L 43/0817 709/224 |
| 2012/0151209 | A1* | 6/2012 | Visnyak | H04L 63/105 713/166 |
| 2014/0007087 | A1* | 1/2014 | Scott-Nash | G06F 21/53 718/1 |
| 2014/0040890 | A1* | 2/2014 | Novak | G06F 21/53 718/1 |
| 2014/0230024 | A1* | 8/2014 | Uehara | H04L 63/1433 726/4 |
| 2016/0149912 | A1* | 5/2016 | Scott-Nash | H04L 63/0876 713/176 |
| 2016/0191623 | A1* | 6/2016 | Vasudevan | G06F 16/951 709/201 |
| 2020/0092103 | A1* | 3/2020 | Zavertnik | G06F 21/44 |
| 2021/0055961 | A1* | 2/2021 | Shah | G06F 21/79 |
| 2021/0243281 | A1* | 8/2021 | Duan | H04W 88/16 |
| 2022/0224538 | A1* | 7/2022 | Zavertnik | G06F 9/45558 |
| 2023/0327861 | A1* | 10/2023 | White | H04B 10/70 713/171 |

\* cited by examiner

A decision to migrate a compute instance CI1 (which has an associated VTPM VTPM1) from a source virtualization server VS1 to a destination virtualization server VS2 is made at the VCS control plane (e.g., in response to a request from the client on whose behalf CI1 was set up, or based on maintenance or other administrative reasons)  701

Instead of transmitting actual seeds used for the different cryptographic hierarchies to VS2, the base primary seed (BPS), nonce values used for bootstrapping VTPM1, and current counter values are transmitted to VS2 (either directly or via the control plane), e.g., in addition to other state information of CI1 (whose execution is paused briefly for the migration); VTPM1 is terminated  704

At VS2, a new VTPM, VTPM2 process is started up using the transferred bootstrap information; VTPM2 in effect starts up cryptographic operations from the state in which VTPM1 was prior to VTPM1 termination  707

Post-migration version of CI1 is started up at VS2 and linked/associated to VTPM2; subsequent cryptographic operations for CI1 are performed using VTPM2  710

FIG. 7

CRYPTOGRAPHIC ARTIFACT GENERATION USING VIRTUALIZED SECURITY MODULES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines or compute instances hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. Virtual machines may be migrated from one physical host or server to another for a variety of reasons.

Many security-related applications, some of which require cryptographic keys and other security artifacts, may be implemented at least partly at virtual machines at provider networks. In some environments cryptographic keys may typically be generated using hardware security devices that are tied to physical servers. This can potentially make migration of virtual machines which utilize such security artifacts a challenge.

BRIEF DESCRIPTION OF DRAWINGS

FIG. 7 is a flow diagram illustrating aspects of operations, associated with virtualized security devices, that may be performed as part of a migration of a compute instance from one virtualization server to another, according to at least some embodiments.

Figure 1:
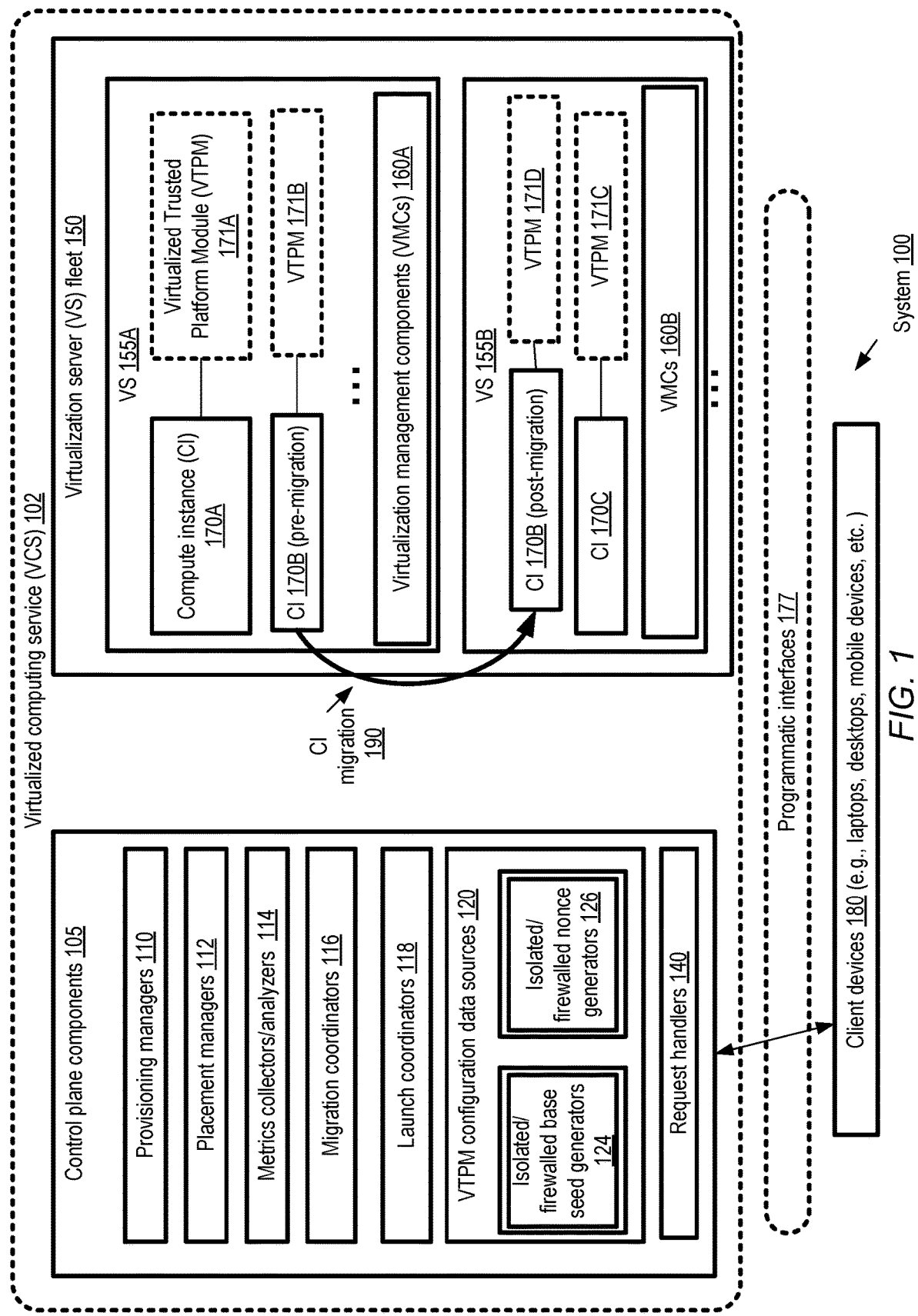
FIG. 1 illustrates an example system environment in which data from multiple isolated control plane components of a virtualized computing service may be combined to generate security artifacts at virtualized security devices for compute instances, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for securely configuring virtualized security devices (VSDs) for compute instances of a virtualized computing service (VCS), such that clients on whose behalf the compute instances are set up are able to utilize functionality equivalent to that provided by hardware security devices (such as Trusted Platform Modules or TPMs, which are typically physically incorporated within hardware servers) while also being able to efficiently and securely migrate compute instances from one server to another if desired. Some virtualized security devices implemented using the techniques described herein are referred to as virtualized TPMs or VTPMs. A VTPM may, for example, implement at least a subset of the programmatic interfaces implemented by a hardware TPM which adheres to a standard defined by the Trusted Computing Group (such as the TPM 2.0 standard).

The VCS can allow its clients to request the launches and migrations of compute instances (such as virtual machines) of several different categories or classes, including for example a VTPM-enabled or VSD-enabled category. A respective VSD (e.g., comprising one or more processes or threads of execution) is instantiated and initialized using a set of instance-specific security data items (including entropy source data) which are dynamically generated at the VCS for individual compute instances of the VSD-enabled categories, e.g., in response to launch requests for the compute instances. Respective subsets of the instance-specific security data items are generated at multiple isolated (e.g., firewalled) VCS administrative resources, such that compromising the security of any given VSD may require multiple successful attacks directly to an extremely secure provider network environment in which even a single attack has a very low probability of success. If and when a VSD-enabled compute instance is migrated to a destination virtualization server other than the source virtualization server on which it was launched initially, a procedure for securely and efficiently initializing a new VTPM at the destination virtualization server is implemented, enabling subsequent security-related operations to be performed at or on behalf of the migrated compute instance with the same security assurances as earlier security-related operations were performed at the migration source virtualization server. Similar procedures may be implemented each time the VSD-enabled compute instance migrates to another virtualization server.

As one skilled in the art will appreciate in light of this disclosure, certain embodiments may be capable of achieving various advantages, including some or all of the following: (a) enhancing the security of computations performed at or on behalf of compute instances of a VCS by utilizing instance-specific virtualized security devices, e.g., instead of potentially having to share a common hardware security device such as a physical TPM across multiple compute instances, while also ensuring that a single successful attack directed at the VCS resources is insufficient to breach the VSDs, (b) migrating VSD-enabled compute instances from one virtualization server with equivalent ease and speed as during the migration of compute instances which do not utilize VSDs, and/or (c) reducing the amount of network traffic required to migrate compute instances which utilize security devices similar to VSDs.

According to some embodiments, a system may comprise one or more computing devices. The computing devices may include instructions that upon execution on or across the computing devices cause the computing devices to set up a plurality of isolated administrative or control plane resources of a VCS that are to be used to initialize and configure VSDs for at least some compute instances launched at the VCS. One of the isolated control plane resources may be referred to as a control plane seed generator (CPSG), while another may be referred to as a control plane nonce generator (CPNG) in some embodiments. A pre-launch preparation procedure for a VSD-enabled compute instance may be started at the VCS control plane, e.g., in response to a programmatic launch request received from a VCS client. As part of the pre-launch procedure, in various embodiments, a unique identifier may be generated for the to-be-launched compute instance, a unique identifier of a virtualization server (VS) at which the compute instance is to be launched may be generated, and one or more public-private key pairs unique to the VS and/or the compute instance may be generated or obtained.

In at least some embodiments, a first VSD initialization data set (VIDS1) comprising an entropy source value (which may also be referred to as a "base seed") may be generated at the CPSG and transmitted to the VS selected for the compute instance as part of the pre-launch procedure. For example, the virtualization server may comprise one or more virtualization management components (VMCs) responsible for orchestrating the setup and teardown of compute instances, and the VIDS1 may be transmitted to one or more of the VMCs in some embodiments. In addition, in various embodiments, a second VSD initialization data set (VIDS2) may be generated and transmitted from the CPNG to the VS. In at least some embodiments, data items included in VIDS2 may include a nonce (e.g., a number obtained from a pseudo-random number generator) and/or a counter value to be used together with the entropy source value and the nonce to determine one or more primary seeds. Such primary seeds may then be used for generating security artifacts at the VSD. In at least some embodiments, VIDS1 may be generated using a mapping function applied to at least the unique identifier assigned to the to-be-launched compute instance, while VIDS2 may be generated using a mapping function applied to at least a unique identifier of the client on whose behalf the compute instance is to be launched. In some implementations, the counter may be a 64-bit value to which increments are only permitted by one, with the counter value being rolled over when the maximum permissible value is reached. In such an implementation, $2^{64}$ such increments are required to re-produce a given counter value. In some embodiments, the counter may be initialized to 1, or set to an integer value selected deterministically based on some property of the compute instance or the client.

The CPSG may be isolated from the CPNG by a firewall and/or other separation mechanisms in at least some embodiments. The CPSG and the CPNG may not have network access to one another in at least one embodiment. In effect VIDS1 (including the entropy source value) may be kept secret from, and may not be accessible to, the CPNG. Similarly, VIDS2 may be kept hidden from, and may not be accessible to, the CPSG in at least some embodiments. In various embodiments, VIDS1 and/or VIDS2 may be encrypted using a public key assigned to the VS selected for the to-be-launched compute instance, with the corresponding private key (which can be used to decrypt VIDS1 and VIDS2) known at the VMCs of the VS selected for the compute instance. In at least some embodiments, both VIDS1 and VIDS2 may be required to correctly configure a VSD to be set up for the compute instance, so in the extremely unlikely event that one of the VSD initialization data sets (VIDS1 or VIDS2) gets compromised, or in the extremely unlikely event that one of the two control plane component components (the CPSG or the CPNG) is compromised, the initialization of the VSD for the compute instance may nevertheless remain uncompromised. As such, it may be impossible to re-generate copies of the security artifacts produced using the VSD unless at least two attacks directed at the VCS control plane are successful. The VCS control plane may be designed with a very high level of security, and hardened against numerous types of attacks in various embodiments, so even a single attack may be very unlikely to succeed; the VSD initialization procedure utilizing the combination of VIDS1 and VIDS2 may thus be extremely secure.

At the VS selected for the compute instance, VIDS1 and VIDS2 may be used together to initialize or bootstrap a VSD for the compute instance. In one embodiment, for example, after the entropy source value (ESV) or base seed has been decrypted, and the nonce and counter values have been decrypted, a composing function (e.g., a hash function similar to an SHA-512 (Secure Hashing Algorithm-512) function) may be applied to extend the ESV to derive a primary seed (PS) value used for at least one category of cryptographic operations implemented using the VSD. In one implementation, the ESV may be passed through the composing function, and then extended using the nonce value by the number of times indicated by the counter value (e.g., if the counter value is K, the composing function may be executed K+1 times in all, with the nonce being used the last K times). After the PS is generated in the bootstrap or initialization procedure of the VSD, it may then be used to generate cryptographic artifacts such as keys (e.g., hierarchies of keys derived from other keys) which can be utilized at or on behalf of the compute instance. The compute instance may be launched and the VSD may be assigned to the compute instance in various embodiments after the VSD has been successfully initialized.

A number of cryptographic operations (such as derivations of keys or other artifacts used for securing access to storage devices or remote resources, attesting the state of the compute instance or its constituent components, digitally signing objects, etc.) may be performed from the compute instance (or from the VMCs, on behalf of the compute instance) using the PS computed for the VSD in various embodiments. In some chains of cryptographic artifacts, with the first cryptographic artifact of a chain being computed using the PS, the second cryptographic artifact of the chain being computed using the first cryptographic artifact, and so on, may be generated as additional cryptographic operations are requested or required for the compute instance. The ESV, the nonce and the counter value may thus in effect be used together to perform a variety of cryptographic operations by the VSD, with a first intermediary step involving the computation of the PS from the ESV, the nonce and the counter, and (depending on the number of hierarchical artifact derivation steps used) other zero or more additional steps involving the generation of intermediary keys/artifacts from the PS and/or its child artifacts.

In at least some embodiments, the VSD may implement one or more programmatic interfaces (e.g., application programming interfaces or APIs) for requesting that the PS be reset or modified. Such resets or modifications interfaces may, for example, be defined in a standard such as the TPM 2.0 standard with which the VSD is compliant in some embodiments, and may be used to clear a security device's settings prior to reinstalling some software or for other reasons. In at least one embodiment, a management console or graphical interface may be implemented to enable clients to view the state of, and if desired modify the state of, a VSD, similar to a TPM management console implemented for non-virtualized servers. In some embodiments, when such a request to modify or reset a PS is received, which may occur at various times during the lifecycle of the compute instance (e.g., after some number of cryptographic operations are performed using the VSD) the counter value associated with the PS may be incremented and saved at persistent storage, and a new PS may be calculated using the modified counter (e.g., by extending the ESV using the updated counter and the nonce in a manner similar to the way the original PS was computed during the initialization of the VSD). Each time another request to reset/modify the PS is received, the counter may be incremented and saved in various embodiments, and the new PS may be generated using the updated counter.

If and when a decision is made to migrate the compute instance for which the VSD was instantiated, in some embodiments, the ESV, the nonce and the current value of the counter (as well as any other elements which may be included within VIDS1 and VIDS2) may be obtained at the destination virtualization server of the migration. In some embodiments, the VIDS1 and VIDS2 contents (with the counter value having potentially been updated, in response to requests or reboots of the kind mentioned above) may be transmitted, e.g., along with other elements of compute instance state information, from the source virtualization server of the migration (the server at which the compute instance was running prior to the migration) to the destination virtualization server of the migration. In other embodiments, the CPSG may send VIDS1 (including the ESV) to the destination virtualization server, and the CPNG may send VIDS2 (with a potentially updated version of the counter) to the destination virtualization server. In an embodiment in which the CPNG is responsible for sending the counter value to the destination virtualization server, the current counter value may first be obtained at the CPNG from the source virtualization server, e.g., by sending a request from the CPNG to the VMCs at the source virtualization server as part of the migration procedure.

At the destination virtualization server, a new VSD may be instantiated using the contents of VIDS1 and VIDS2 in various embodiments, e.g., using a bootstrap procedure similar to that discussed above for the instance launch of the compute instance, with the potentially updated counter value being used instead of the initially-selected counter value in the bootstrap procedure used for the post-migration VSD. The newly-instantiated VSD may thus generate its own PS for at least one category of cryptographic operations. In at least some embodiments, this newly-generated PS may be the identical to PS that was being used for the same category of cryptographic operations at the pre-migration compute instance's VSD. Note, however, that the PS itself may not have to be transmitted to the destination virtualization server, thus saving network bandwidth. The amount of network bandwidth saved may depend for example on the number of distinct PSs being used at a VSD and how often compute instances are migrated; as discussed below in further detail, several different PSs may be used at some VSDs. The migrated version of the compute instance may be launched at the destination virtualization server, and the new VSD may be used to perform additional cryptographic operations as needed. For example, additional cryptographic keys or artifacts may be generated using the new PS, which in turn was generated using the combination of the ESV, the nonce and the potentially update counter value.

In at least some embodiments, the VMCs of the virtualization host at which a new compute instance is to be launched (or to which an existing compute instance is to be migrated) may wait until the contents of VIDS1 and VIDS2 have been obtained, and if necessary decrypted, before launching a VSD comprising one or more processes or threads of execution for the compute instance. In addition, in some such embodiments, the VMCs may wait until the VSD has been launched successfully before launching the compute instance itself. In other embodiments, the compute instance may be launched before its VSD, and/or the VSD may be launched before the contents of VIDS1 and VIDS2 are received. According to at least one embodiment, a VSD may comprise one or more processes or threads launched and executed at an offloading card attached for example via a peripheral interconnect such as PCIe (Peripheral Component Interconnect-Express) to the primary processors of a virtualization server.

According to one embodiment, respective primary seeds (PSs) may be generated at a VSD for several different groups, categories or hierarchies of cryptographic operations. For example, respective primary seeds may be generated (e.g., using a separate nonce and counter value for each hierarchy, generated and propagated using techniques similar to those described above) for a platform hierarchy, an endorsement hierarchy, a storage hierarchy, and/or a null hierarchy. One or more of such hierarchies may be defined, for example, in a Trusted Computing Group (TCG) standard such as the TPM 2.0 standard. In some embodiments, a given PS used at a VSD of a compute instance may have to be reset or modified every time the compute instance reboots, e.g., in addition to or instead of being reset/modified in response to programmatic requests. In at least some embodiments, multiple VSDs of the kind discussed above may be launched at a single virtualization server, e.g., for respective compute instances launched at the virtualization server. In one embodiment, multiple VSDs may be launched and utilized for a single compute instance, e.g., in response to programmatic requests from the client on whose behalf the compute instance is set up. Note that the configuration and use of a VSD at a virtualization server may not be dependent on their being a physical hardware security device (such as a physical TPM) at that virtualization server in at least some embodiments. For example, respective VTPMs may be launched for one or more compute instances on a virtualization server that does not include a hardware TPM in such embodiments. In one embodiment, even if a virtualization server includes a hardware TPM, the operations performed at a VTPM launched at that server may be independent of, and may not utilize results of, the hardware TPM.

In at least some embodiments, a virtualized computing service at which VSDs or VTPMs are set up may be implemented as part of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances of the kind discussed above (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a VSD-enabled instance type, a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane (such as the operations of the CPSG and CPNG discussed above) and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Example System Environment With Offloading Resources For Virtual Routers

FIG. 1 illustrates an example system environment in which data from multiple isolated control plane components of a virtualized computing service may be combined to generate security artifacts at virtualized security devices for compute instances, according to according to at least some embodiments. As shown, system 100 comprises resources and artifacts of a virtualized computing service (VCS) 102, including control plane components 105 and a fleet 150 of virtualization servers (VSs) 155, also referred to as virtualization hosts. The control plane components 105 may perform various types of administrative operations associated with compute instances (CIs) 170 set up at VSs 155 in response to programmatic requests from clients of the VCS 102 in the depicted embodiment, such as launching/starting the CIs, terminating CIs, modifying properties of the CIs, migrating CIs from one VS to another, and so on.

VCS 102 may implement a set of programmatic interfaces 177 in the depicted embodiment, such as one or more web-based consoles, command-line tools, graphical user interfaces, application programming interfaces (APIs) and the like, which may be used by VCS clients to submit programmatic requests pertaining to CIs, and to receive corresponding responses from the VCS control plane components. For example, a client may use the programmatic interfaces 177 to submit CI launch requests, migration requests and the like from client devices 180 such as laptops, desktops, mobile computing devices and the like. The requests may be processed initially by a set of request handlers 140 of the VCS control plane, which may in turn pass on internal versions of the requests to one or more other control plane components 105. Response to the internal versions of the requests may eventually be received at the request handlers 140 and passed on to the client devices 180.

Control plane components 105 of the VCS may include, in addition to the request handlers, one or more provisioning managers 110, placement managers 112, metrics collectors/analyzers 114, migration coordinators 116, launch coordinators 118, and VTPM (virtualized TPM) configuration data sources 120 in the depicted embodiment. Individual ones of these components may be implemented using some combination of software and hardware at one or more computing devices in various embodiments.

The VCS may provide descriptors of a variety of compute instance types or categories which can be launched at the request of VCS clients in the depicted embodiment. CIs of one category may differ from those of another along various dimensions—e.g., some categories of CIs may be optimized for graphics-oriented applications, others may be optimized for machine learning applications, and so on. In at least some embodiments, one of the categories may comprise compute instances equipped or configured with virtualized security devices (VSDs) such as VTPMs. Such compute instances, referred to as VSD-enabled or VTPM-enabled compute instances, may each have a respective VSD or VTPM allocated or assigned to them, e.g., by virtualization management components (VMCs) such as VMC 160A or VMC 160B at the VSs 155. VMCs may, for example, include on-host hypervisors run using the primary processors or CPUs of the VSs, offloaded virtualization management components run on processors incorporated within offload cards, and so on in different embodiments.

In the embodiment depicted in FIG. 1, a given VTPM may be initialized or configured using a set of data generated at a plurality of independent and isolated VTPM configuration data sources 120. These sets of data may be referred to as VSD initialization data sets (VIDSs). For example, isolated/firewalled base seed generators 124 may generate a respective entropy source value for a given VTPM 171 (e.g., 171A, 171B, etc.), while isolated/firewalled nonce generators 126 may generate a respective set of one or more nonces and/or one or more counters for each VTPM 171. The base seed generators 124 and the nonce generators 126 may not have access to each other's data in the depicted embodiment—e.g., a base seed generator 124 may not be able to access or obtain nonces generated at the nonce generators 126, and a nonce generator 126 may not be able to access or obtain entropy source values generated at the base seed generators 124. Network connectivity may not be enabled between the base seed generators 124 and the nonce generators 126 in at least some embodiments. To correctly configure and initialize a VTPM (or more generally a VSD), VTPM configuration data obtained from a base seed generator may have to be utilized in combination with the VTPM configuration data from a nonce generators at a VS 155 in various embodiments.

When a request to launch a VSD-enabled CI 170 is received from a client, e.g., via programmatic interfaces 177 in the depicted embodiment, a pre-launch preparation procedure which includes initialization or configuration of a VTPM may be implemented at the VCS control plane in the depicted embodiment, e.g., by a launch coordinator 118. As part of such a preparatory procedure, a unique identifier may be generated for the to-be-launched CI, a unique identifier of the VS 155 at which the compute instance is to be launched may be obtained, and a public-private key pair unique to the VS and/or the CI may be identified in at least some embodiments. The particular VS 155 to be used for the CI may be identified, for example, by a provisioning manager 110 and/or a placement manager 112. A provisioning manager may determine whether a new VS has to be brought online, given the current utilization levels of various VSs of fleet 150 in some embodiments. A placement manager may, for example, select a particular VS from among several available VSs, e.g., based on factors such as the client's preferences regarding proximity to other CIs of the client, the VCS' s internal goals regarding load balancing across VSs, and so on.

In some embodiments, a respective VTPM initialization data set (VIDS) may be generated by a based seed generator 124 and by a nonce generator 126 for the to-be-launched CI's VTPM in the depicted embodiment. The VIDS generated by the base seed generator, which may be referred to as VIDS1, may include one or more base seeds, derived for example by applying a mapping function (e.g., a hash function) to the unique CI ID. The VIDS generated by the nonce generator 126, VIDS2, may include one or more nonces and counter values for each of several different categories or hierarchies of cryptographic operations, may for example be derived by applying one or more mapping functions to information identifying the client on whose behalf the CI is to be launched. In some cases, other metadata unique to the CI request may be used to generate the VIDS, with different subsets of the metadata being used at the base seed generator and the nonce generator. In some embodiments a pool of base seed generators may be maintained at the VCS control plane, and scaled up or down as needed based on changing demands for instance launches. Similarly, in some embodiments, a pool of nonce generators may be maintained and scaled up or down as needed. The particular base seed generator used for a given CI, and the particular nonce generator used for a given CI may be chosen from the respective pools using a variety of techniques, including load balancing algorithms, mappings from CI IDs or client identifiers, and so on in different embodiments. In some embodiments, new base seed generators and/or nonce generators may be instantiated on demand instead of using pre-created pools. In various embodiments, a given base seed generator and/or a nonce generator may comprise one or more processes or threads of execution.

VIDS1 and VIDS2 may be sent from their respective VTPM configuration data sources 120 to the VS 155 selected for launching the VSD-enabled CI in the depicted embodiment. In at least some embodiments VIDS1 and VIDS2 may be sent after they are each encrypted independently using a public key of a key pair whose corresponding private key is known at the VS 155. At the VS 155, elements of both VIDS1 and VIDS2 may be used together to perform at least a subset of operations needed to initialize or configure a VTPM 171 for the CI. For example, in one implementation, a composing function (e.g., a hash function similar to functions of the SHA family) may be applied first to an entropy source value (base seed). Then, the result of the initial composing function execution may be extended using a nonce value by again applying the composing function N times, where N is the value of the counter obtained at the VS for the VTPM. The final result after the nonce-based and counter-value-dependent extensions may be used as a primary seed (PS) by the VTPM 171 for generating one or more hierarchies of cryptographic artifacts such as keys for the CI. The VTPM 171 may comprise one or more processes or threads in various embodiments. In some embodiments, the VTPM may be initialized or configured (using the VTPM configuration data) received at the VMCs 160 from the data sources 120 before the CI is launched and associated with the VTPM. After the VTPM has been initialized/configured and the CI has been launched, a variety of cryptographic or security operations may be conducted for or by the CI using the VTPM, including generation of various security artifacts such as derived keys, digital signatures and the like in various embodiments. As shown in FIG. 1, respective VTPMs may be configured for each VSD-enabled CI at a given VS 155 in at least some embodiments—e.g., VTPM 171A may be set up for CI 170A, VTPM 171B may be set up for CI 170B, and so on. In some cases, multiple VSDs may be configured for use by a single CI.

In at least some embodiments, one or more of the primary seeds used at a VTPM 171 for generating security artifacts may have to be reset or modified under certain conditions. For example, some VTPMs may implement programmatic interfaces, such as APIs compliant with TCG standards, which can be used to request such resets or modifications. For some categories of cryptographic operations, such as operations of the null category discussed below, the primary seeds may have to be reset every time a compute instance is rebooted or restarted. In order to facilitate such resets, especially in scenarios in which the VSD-enabled compute instances potentially have to be migrated from one VS to another, the counter values used for the initialization of a VTPM 171A may be incremented (or otherwise updated, e.g., by adding an integer value other than 1) and stored at persistent storage devices accessible from the VS each time such a reset is requested (e.g., by an invocation of an API) or triggered (e.g., by a reboot of the CI) in some embodiments. The updated counter values may then be used to re-generate the corresponding primary seeds using the composing function (applied to the entropy source value and an appropriate nonce received earlier) as described above.

A decision to migrate a VSD-enabled CI 170 from one VS to another may be made by a migration coordinator 116 of the VCS control plane for any of several reasons in the depicted embodiment. For example, a decision to migrate CI 170B from source VS 155A to destination VS 155B (which already has CI 170C with associated VTPM 171C running) may be made based on the analysis of metrics from the source and destination VSs, performed at metrics collectors/analyzers 114; such a CI migration 190 may be responsive to workload imbalances between the source and destination VSs, indicating that one or more resources of VS 155A are much more heavily utilized than the corresponding resources of VS 155B. Some CI migrations 190 may be initiated based on a planned maintenance event (e.g., an upgrade of hardware or VMCs) at VS 155A in one embodiment. Other CI migrations 190 may be initiated based on programmatic CI migration requests received from clients via interfaces 177 in some embodiments.

When a decision to migrate a VSD-enabled CI 170 has been made and a destination VS such as 155B has been identified, in at least some embodiments, the current counter value(s) used for initializing or re-initializing the VTPM of the to-be-migrated CI may be transmitted to the destination VS in some embodiments. In addition, other components of the VIDSs which were used for initializing the pre-migration VTPM, such as an entropy source value and one or more nonce values, may also be sent to the destination VS. There, the updated counter values and the other VIDS data may be used to initialize a new VTPM for the to-be-migrated CI. For example, in the case of CI 170B, VTPM 171D for the post-migration version of the CI may be initialized/configured using the most recent counter value stored at VS 155A for VTPM 171A, as well as the original base seed value (entropy source data) which was used for initializing VTPM 171A and the nonce(s) used for initializing VTPM 171A. VTPM 171A may be terminated, and the new VTPM 171D may resume security operations from the same state at which VTPM 171A was when VTPM 171A was terminated. After the post-migration version of CI 170B is launched at the destination VS 155B by VMCs 160B, subsequent security operations (such as generation of keys and other security artifacts) may be performed for CI 170B using VTPM 171D in the depicted embodiment. The primary seeds which were being used for the security operations by VTPM 171A may not have to be transmitted to VS 155B in at least some embodiments. In some embodiments, the updated data items (such as counters) of the VIDSs may be sent from VS 155A to VS 155B directly; in other embodiments, the updated data items (if any) may be sent to the nonce generator 126 from the source VS 155A and the VIDSs for the post-migration VTPM may be sent from the VTPM configuration data sources 120 to the destination VS 155B. If and when a CI such as 170B is migrated again to another VS, the process used for the initial migration may be repeated in the depicted embodiment, e.g., with the current version of the counters being transmitted to the new migration destination to enable a new VTPM to be initialized appropriately.

Example Categories of Cryptographic Operations

Figure 2:
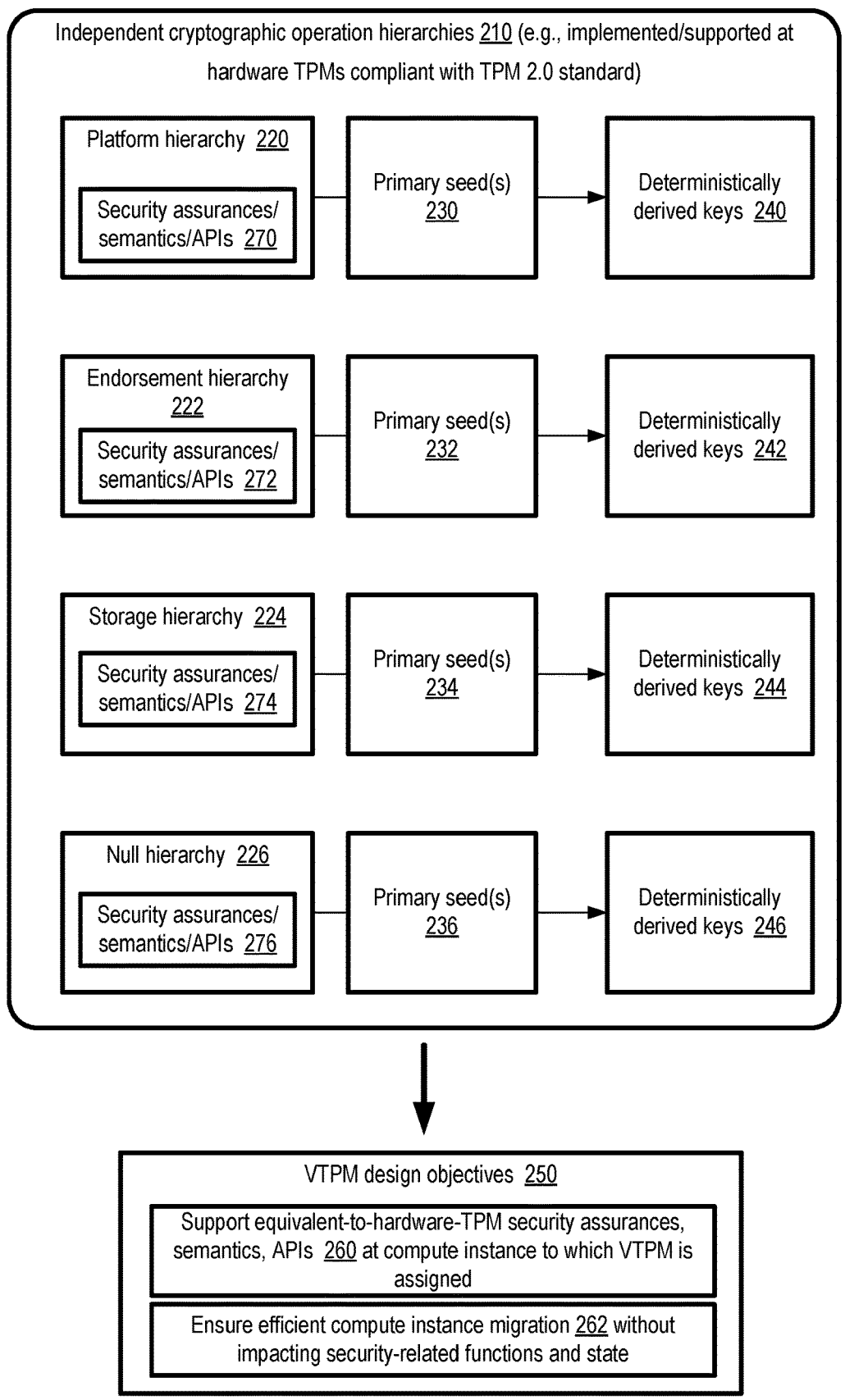
FIG. 2 illustrates example categories of independent cryptographic operation hierarchies which may have to be supported by virtualized security devices, according to at least some embodiments.

FIG. 2 illustrates example categories of independent cryptographic operation hierarchies which may have to be supported by virtualized security devices, according to at least some embodiments. In the depicted embodiment, a virtualized security device such as a VTPM may be designed to support several hierarchies 210 of cryptographic or security operations defined in an industry standard such as the TCG TPM 2.0 standard with which many hardware TPMs are compliant.

The supported hierarchies may include, for example, a platform hierarchy 220, an endorsement hierarchy 222, a storage hierarchy 224, and a null hierarchy 226 in the depicted embodiment. The different hierarchies may be intended for use for respective types of security requirements, or for different layers of hardware/software stacks. For example, the platform hierarchy may be intended for firmware-level operations, while the endorsement hierarchy may be intended for host or server attestation (using artifacts such as endorsement keys and endorsement key certificates). The storage hierarchy may be intended for use by an operating system and/or other software that requires that keys persist across power cycles (e.g., including keys intended to secure access to storage devices). The null hierarchy (also referred to as an ephemeral hierarchy) may be intended for general purpose cryptographic operations that do not require keys to remain persistent across power cycles/reboots. Each of the hierarchies may have a respective set of security assurances, semantics and APIs, such as 270, 272, 274 and 276 for the platform, endorsement, storage and null hierarchies respectively. One or more primary seeds or entropy source values may be utilized for each of the hierarchies in different embodiments, such as primary seeds 230 for the platform hierarchy, primary seeds 232 for the endorsement hierarchy, primary seeds 234 for the storage hierarchy, and primary seeds 236 for the null hierarchy. Once the primary seeds (which may also be referred to as entropy source values) are determined for a given hierarchy, a respective set of cryptographic keys or other artifacts may be derived deterministically from the primary seeds in the depicted embodiment. Thus, for example, deterministically derived keys 240 may be generated using primary seeds 230, deterministically derived keys 242 may be generated using primary seeds 232, deterministically derived keys 244 may be generated using primary seeds 234, and deterministically derived keys 246 may be generated using primary seeds 236.

In at least some embodiments, VTPM design objectives 250 of a VCS similar in functionality to VCS 102 of FIG. 1 may include an objective that, at compute instances to which a VTPM is assigned, the VTPM should support at least some of the same types of security assurances, semantics and APIs 260 as are supported by physical TPMs that comply with standards such as TPM 2.0. A second objective may include ensuring efficient compute instance migration 262, without impacting the security-related functions and state of the VTPMs. Both these types of objectives may be satisfied using the techniques described herein in various embodiments.

Example Operation Sequence to Configure VSDs

Figure 3:
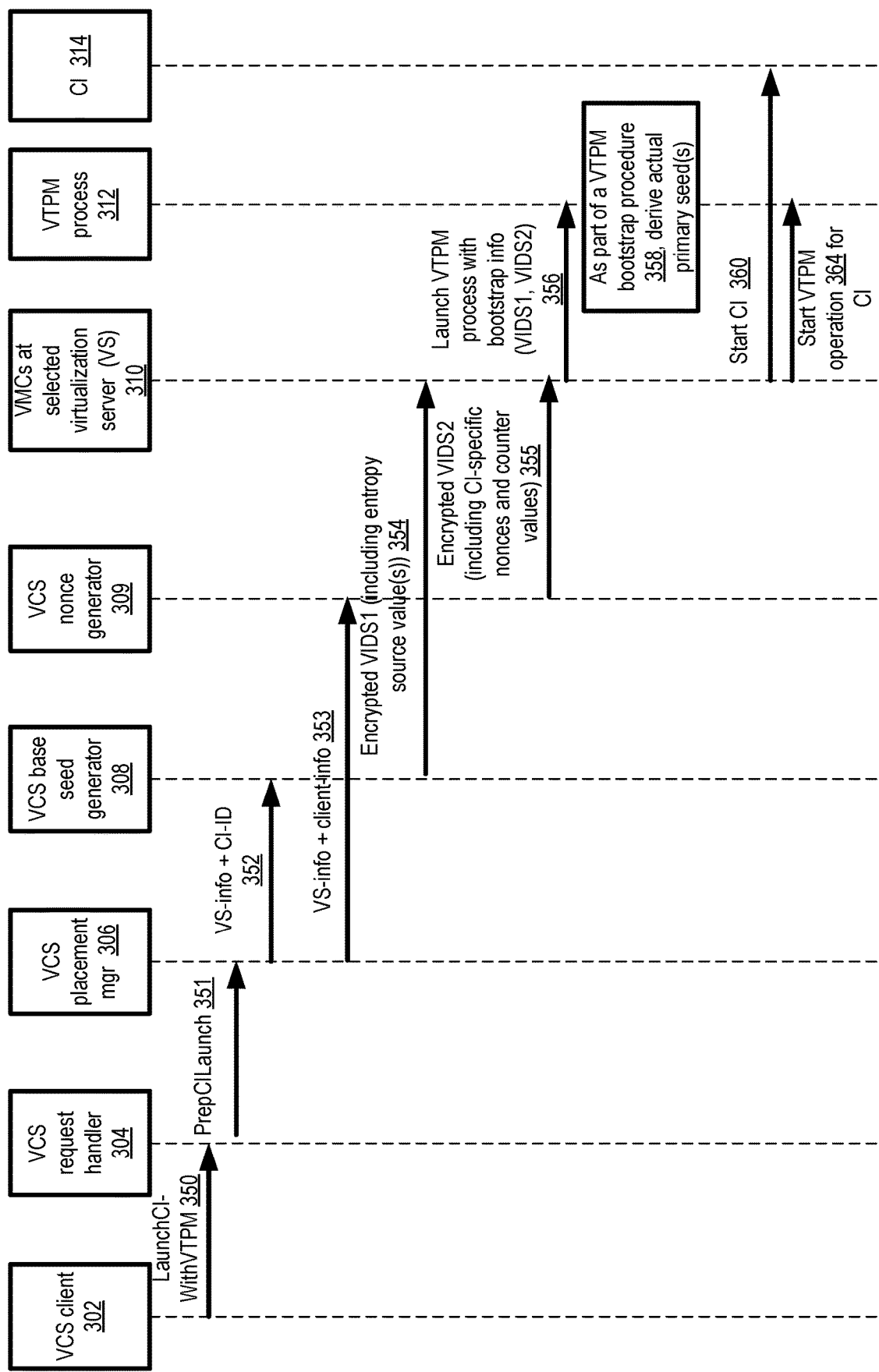
FIG. 3 illustrates an overview of operations which may be performed to configure virtualized security devices in response to requests to launch compute instances, according to at least some embodiments.

FIG. 3 illustrates an overview of operations which may be performed to configure virtualized security devices in response to requests to launch compute instances, according to at least some embodiments. In the depicted embodiment, a client 302 of a VCS similar in functionality to VCS 102 of FIG. 1 may submit a programmatic request LaunchCIWithVTPM 350 for a compute instance with a VTPM. A VCS request handler 304 may receive the request and send one or more internal messages to other components of the VCS control plane, such as a PrepCILaunch request 351 to prepare for a compute instance launch.

In the embodiment depicted in FIG. 3, a VCS placement manager 306 may identify a particular virtualization server (VS) at which the requested CI is to be launched. Other VCS control plane components (not shown in FIG. 3) may also participate in the selection of the VS in some embodiments. Information (VS-info) which uniquely identifies the selected VS (such as a unique VS identifier) as well as a unique instance identifier (CI-ID) selected for the to-be-launched CI may be sent to a VCS base seed generator 308 from the placement manager 306 and/or other control plane components in the depicted embodiment, as indicated by the label for arrow 352. The VS-info as well as information (client-info) which identifies the client 302 on whose behalf the CI is to be launched may be sent to a VCS nonce generator 309 in various embodiments (arrow 353).

The base seed generator 308 may use a mapping function, to which at least the CI-ID is provided as input, to generate a first VSD initialization data set VIDS1 comprising an entropy source value (ESV) in the depicted embodiment. The ESV may comprise a base primary seed from which one or more additional primary seeds used for cryptographic operation hierarchies of the kind discussed above may later be derived at the VTPM during the VTPM's initialization or configuration in some embodiments. The nonce generator 309 may use another mapping function (or the same type of mapping function), to which at least client-info is provided as input, to generate contents of a second VSD initialization data set VIDS2 comprising one or more nonces and/or associated counter values which may also be used during VTPM configuration/initialization at the VS in the depicted embodiment.

VIDS1 may be encrypted, e.g., using a public key associated with the selected VS, and transmitted to VMCs 310 at the selected VS from the base seed generator 308 in the depicted embodiment (arrow 354). VIDS2 may also be encrypted, e.g., using the public key associated with the selected VS, and transmitted to VMCs 310 at the selected VS from the nonce generator 309 in the depicted embodiment (arrow 355).

In at least some embodiments, a VTPM process 312 may be launched or instantiated by the VMCs 310 at the VS before the CI is launched. Bootstrap information to be used to initialize the VTPM, including decrypted versions of VIDS1 and VIDS2, may be passed to the VTPM process 312 from the VMCs 310, as indicated by label 356. As part of the VTPM bootstrap procedure 358, one or more primary seeds corresponding to respective hierarchies of security operations may be generated from VIDS1 and VIDS2 at the VTPM process 312 in the depicted embodiment, e.g., using one or more composing functions of the kind discussed above. After the VTPM has been successfully initialized and configured to start performing security operations, the CI 314 requested by the client may be launched by the VMCs 310 in the depicted embodiment at the VS, as indicated by arrow 360. The VTPM process 312 may be designated specifically for the CI 314, e.g., by storing metadata indicating that the VTPM process is required to respond to requests from no other CI than CI 314 in various embodiments. The VMCs may send a message (Start VTPM operation 364) to the VTPM process after the CI 314 has been started to indicate that the CI has been started and may send requests to the VTPM for security operations in the depicted embodiment. Various types of security artifacts, such as hierarchies of cryptographic keys, may be generated starting from the primary seeds of VTPM process 312 in the depicted embodiment. Multiple VTPMs may be instantiated in some embodiments at a given VS, e.g., for respective CIs or for a given CI using an approach similar to that shown in FIG. 3.

In some embodiments, one or more operations shown in FIG. 3 may be performed somewhat differently than shown in the figure. For example, in one embodiment, the VMCs may generate the primary seeds from VIDS1 and VIDS2 and provide them to the VTPM process. In another embodiment, a counter manager of the VCM control plane (separate from and independent of the nonce generators shown in FIG. 3) may generate respective counters to be used to generate the primary seeds during VTPM configuration. In such an embodiment, three independent VCS control plane components may be involved in preparing the initialization data set for a VTPM: one component for the base seed, one component for nonces, and one for counters. The specific techniques and functions (e.g., mapping functions) used for generating the base seed, the nonce(s) and/or the counters may differ in different embodiments.

Figure 4:
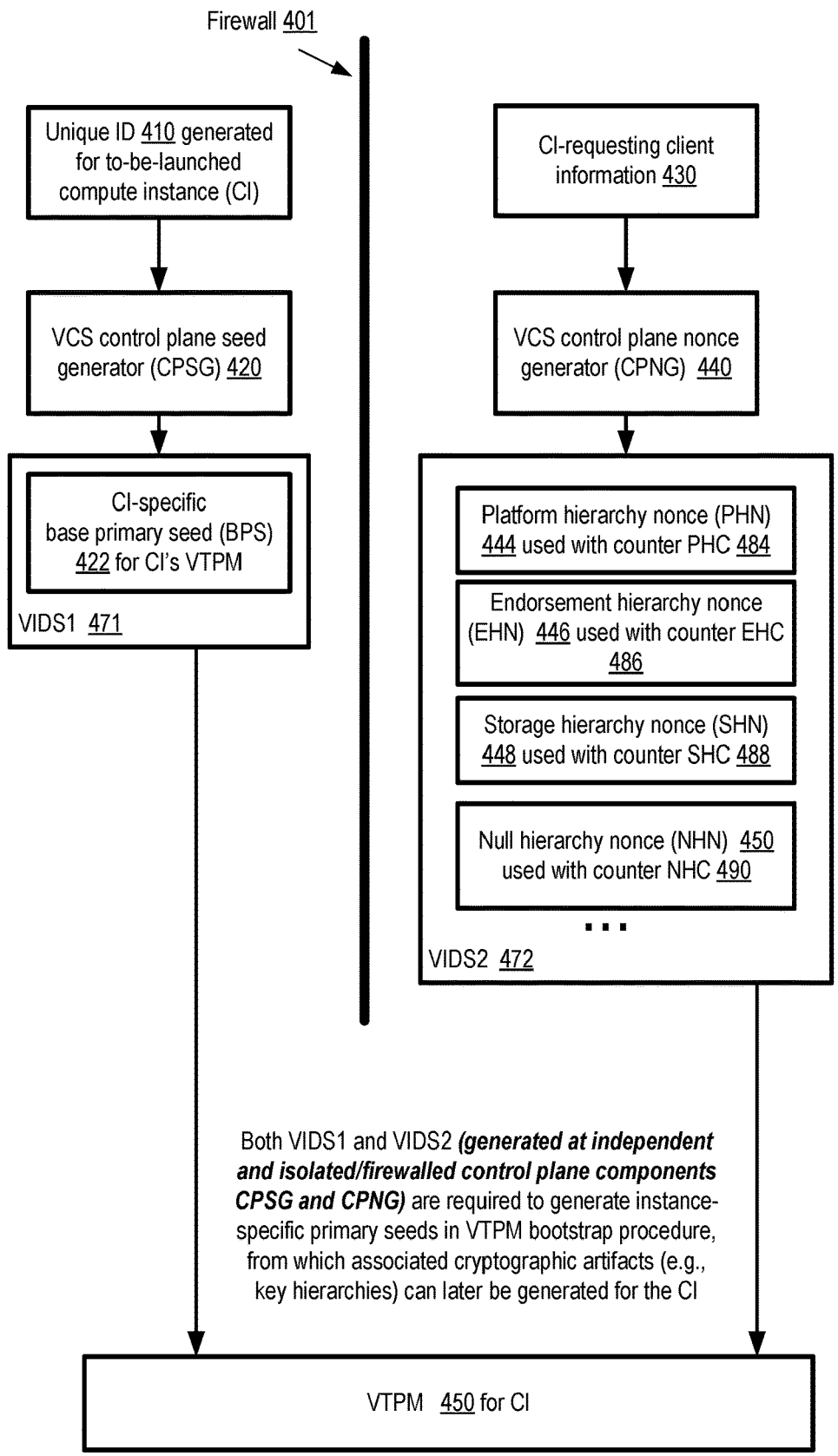
FIG. 4 illustrates contents of example initialization data sets which may be prepared at control plane components of a virtualized computing service for a virtualized security device of a to-be-launched compute instance, according to at least some embodiments.

FIG. 4 illustrates contents of example initialization data sets which may be prepared at control plane components of a virtualized computing service for a virtualized security device of a to-be-launched compute instance, according to at least some embodiments. In the depicted embodiment, a firewall 401 is established to isolate a VCS control plane seed generator (CPSG) 420 from a VCS control plane nonce generator (CPNG) 440. A unique identifier 410 of a to-be-launched compute instance may be provided to the CPSG 420 in response to obtaining a request to launch a compute instance at the VCS control plane in the depicted embodiment. Information 430 identifying or indicating the client on whose behalf the CI is to be launched with an associated VTPM or similar virtualized security device (VSD) may be provided to the CPNG 440.

From the unique ID 410, a first VSD initialization data set VIDS1 471 comprising a CI-specific base primary seed (BPS) 422 for the CI's VTPM may be computed or determined at the CPSG 420 in the depicted embodiment. Using the client information ID 430 as input, a second VSD initialization data set VIDS2 472 comprising a plurality of CI-specific nonce values and associated initial values of counters may be determined at the CPNG 440 in the depicted embodiment. In some embodiments in which categories or hierarchies of cryptographic operations similar to those shown in FIG. 2 are to be supported at the VTPM of the CI, at least four nonces with associated initial counter values may be determined. A platform hierarchy nonce (PHN) 444 with a corresponding platform hierarchy counter initial value PHC 484 which are to be used together with the BPS when generating the platform hierarchy primary seed at the VTPM may be included in VIDS2 in the depicted embodiment, for example. VIDS2 may also include an endorsement hierarchy nonce (EHN) 446 with a corresponding endorsement hierarchy counter value EHC 486, a storage hierarchy nonce (SHN) 448 with a corresponding storage hierarchy counter value SHC 488, and/or a null hierarchy nonce (SHN) 450 with a corresponding null hierarchy counter value NHC 490 in at least some embodiments. In various embodiments in which other hierarchies of cryptographic or security operations are supported at the VTPM, respective nonces and associated counter values for each of the hierarchies may be generated or determined at the CPNG.

In some implementations, the number of bits to be used to represent the BPS, the nonce(s) and/or the counter values may be selected at the VCS, e.g., based at least in part on input from a VCS client. For example, in one implementation, 512 bit integers may be used for the BPS and the nonces, and 64 bit integers may be used for the counter values; in other embodiments, smaller or larger numbers of bits may be used for the different data elements of VIDS1 and/or VIDS2. In some embodiments, VIDS1 and/or VIDS2 may include other data (not shown in FIG. 4) which may also be utilized during VTPM configuration or initialization. In at least one embodiment, the contents of VIDS1 and/or VIDS2 corresponding to a given CI (e.g., indexed using the CI ID) and/or a given client (e.g., indexed using a client identifier and/or a client request ID) may be stored in respective repositories—e.g., one repository for VIDS1s and a separate repository for VIDS2s. The contents of the repositories may be used (along with potentially updated counter values) during instance migrations in some embodiments, e.g., to correctly initialize VTPMs at the migration destination VSs.

Methods for VSD Management

Figure 5:
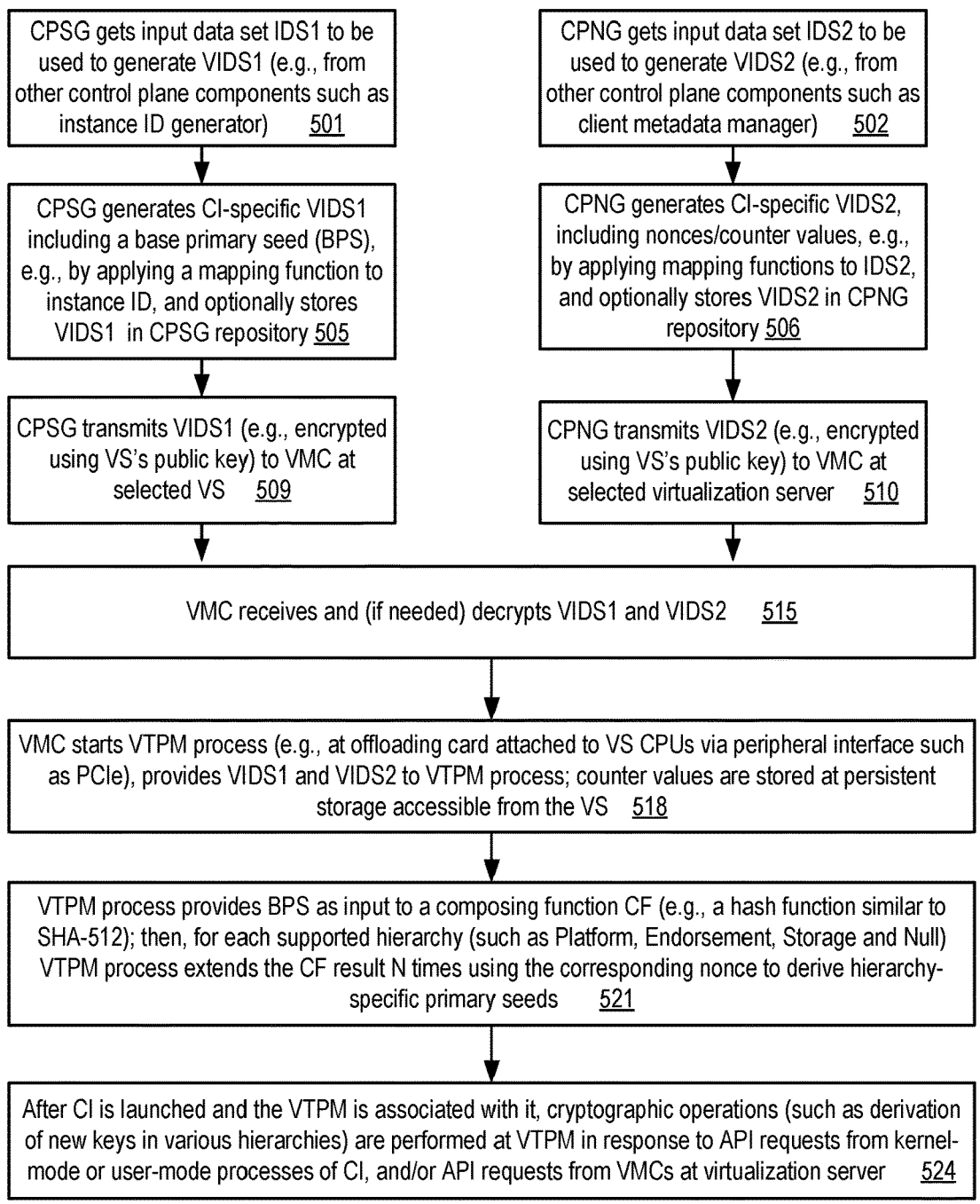
FIG. 5 is a flow diagram illustrating aspects of operations that may be performed to enable virtualized security devices to be utilized for cryptographic operations at a compute instance of a virtualized computing service, according to at least some embodiments.

FIG. 5 is a flow diagram illustrating aspects of operations that may be performed to enable virtualized security devices to be utilized for cryptographic operations at a compute instance of a virtualized computing service, according to at least some embodiments. As shown in element 501, a control plane seed generator (CPSG) of a VCS similar to VCS 102 of FIG. 1 may obtain an input data set IDS1 to be used to generate a VSD initialization data set VIDS1, e.g., from other VCS control plane components such as an instance ID generator responsible for assigning unique identifiers to to-be-launched CIs. IDS1 may be provided to the CPSG, for example, as part of a pre-launch preparatory procedure for a VSD-enabled compute instance requested by a client. The CPSG may generate a CI-specific VSD initialization data set VIDS1, including a base primary seed (BPS) computed specifically for the CI, and optionally store VIDS1 in a CPSG repository (element 505). In some implementations, at least a portion of VIDS1 may be generated by applying a mapping function to the CI identifier included in IDS1. Optionally, in some embodiments VIDS1 may be stored in a CPSG repository from which it can be retrieved by the CPSG (if needed for example for a CI migration) using a portion of the IDS1 as a search attribute.

A control plane nonce generator (CPNG) may obtain a second input data set IDS2 to be used to generate a second VSD initialization data set VIDS2 in the depicted embodiment (element 502). IDS2 may include information (such as a client identifier, an identifier of an isolated virtual network of the client, etc.) pertaining to the client on whose behalf the CI with a VSD is to be launched in various embodiments. IDS2 may be provided to the CPNG, for example, as part of a pre-launch preparatory procedure for the VSD-enabled CI. Using IDS2, the CPNG may generate one or more elements of VIDS2, e.g., including one or more nonces and associated counter values of the kind discussed in the context of FIG. 4 in some embodiments (element 506). One or more mapping functions may be applied to at least a portion of IDS2 to generate VIDS2 in the embodiment depicted in FIG. 5. Optionally, in some embodiments VIDS2 may be stored in a CPNG repository from which it can be retrieved by the CPNG (if needed for example for a CI migration) using a portion of the IDS2 as a search attribute. The CPSG and the CPNG may be implemented (e.g., as respective processes or threads of execution) at isolated control plane resources (e.g., with a firewall configured to isolate the resources from each other) in some embodiments. VIDS1 and VIDS2 may be referred to as CI-specific as they may typically comprise different data for different CIs in various embodiments—e.g., the BPS generated for one CI CI1 may differ from the BPS generated for another CI CI2, a nonce generated for CI1 may differ from the corresponding nonce generated for CI2, and so on.

The CPSG may transfer the CI-specific VIDS1 (e.g., encrypted using a public key of the VS) to a virtualization management component (VMC) at a selected VS for the CI (element 509) in the depicted embodiment. The CPNG may transmit the CI-specific VIDS2 (e.g., encrypted using a public key of the VS) to a VMC of the VS as well in at least some embodiments (element 510). The VMC may receive and, if needed, decrypt VIDS1 and VIDS2 in the depicted embodiment (element 515).

According to at least some embodiments, the VMC may start a VTPM process or VSD process (e.g., at an offloading card attached to the primary CPUs of the VS via a peripheral interface such as PCIe) for the CI, and provide VIDS1 and VIDS2 to the VTPM process (element 518). The VTPM/VSD process may utilize one or more composing functions (e.g., a hash function similar to SHA-512's hash function), which consumes one or more numeric values as input and maps the input to a number within a specified range (e.g., 0 to $2^k-1$ where k is a parameter of the composing function) to generate one or more primary seed values in the depicted embodiment (element 521). For example, for a given hierarchy of the platform, endorsement, storage and null hierarchies discussed earlier, respective primary seeds may be generated using a technique similar to the following. First, the BPS may be provided as input to the composing function, resulting in an intermediary output O1. Then, O1 and a nonce value for the hierarchy (such as PHN, EHN, etc., discussed in the context of FIG. 4 and included in VIDS2) may be provided as input to the composing function to obtain a second output O2. If the counter value for the hierarchy (such as PHC, EHC etc., discussed in the context of FIG. 4) has a value n other than 1, then the process of applying the composing function using the nonce may be repeated n times, extending or modifying the output each time. The final output of the composing function (after the composing function has been applied n+1 times) may be used as the primary seed for the hierarchy in such an implementation. Other techniques which use elements of VIDS2 and VIDS1 together to obtain the primary seeds may be utilized in different embodiments. In one embodiment, at least a portion of the contents of VIDS1 and VIDS2, including the counter values, may be stored at secure persistent storage devices accessible from the VS (e.g., either local storage devices or a remote storage device).

Figure 6:
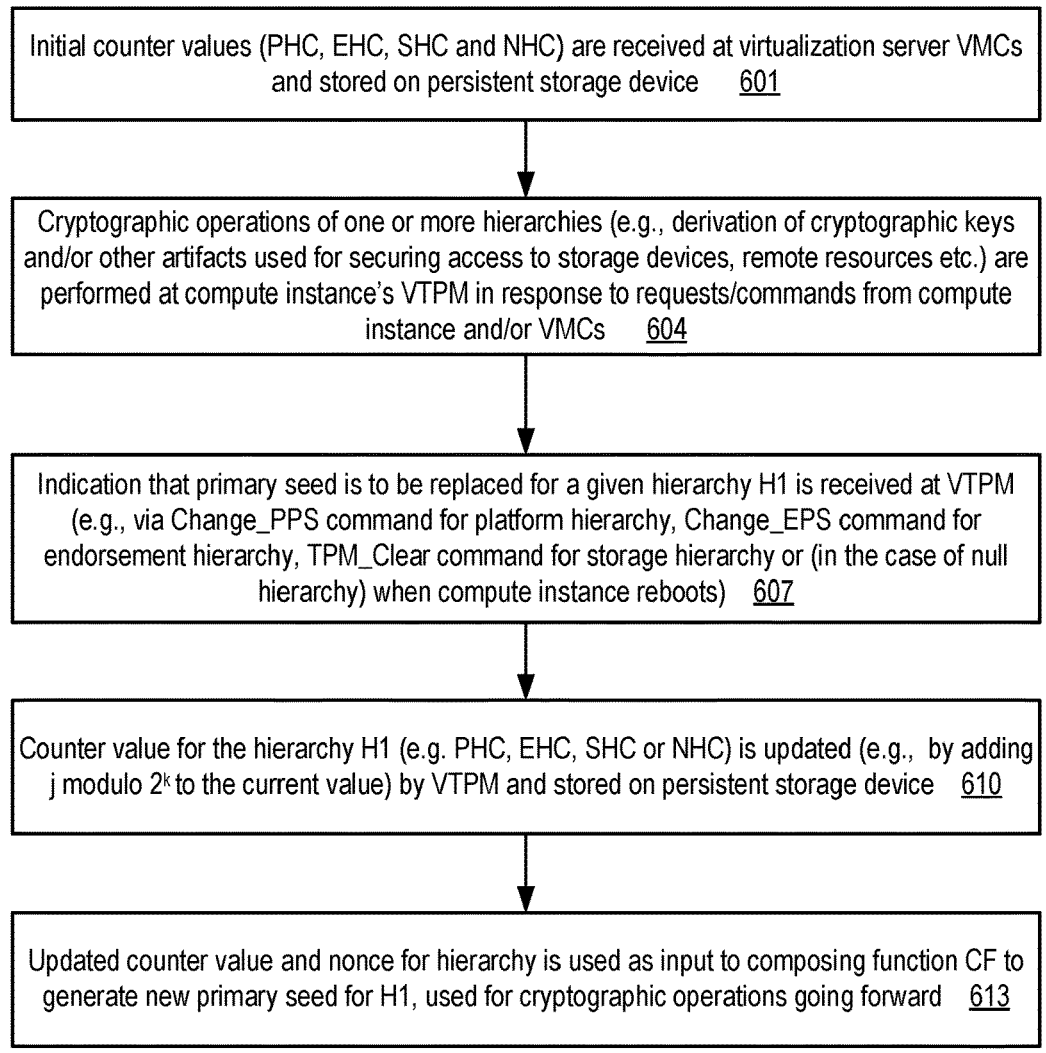
FIG. 6 is a flow diagram illustrating aspects of operations that may be performed in response to a request to replace a primary seed for a hierarchy of cryptographic operations of a compute instance, according to at least some embodiments.

The requested CI itself may be launched and the VTPM/VSD may be assigned/associated with it in various embodiments. Cryptographic operations (such as derivations of new keys or other security artifacts in various hierarchies of the) may be performed at the VTPM/VSD on behalf of the CI, e.g., in response to API requests from kernel-mode and/or user-mode processes of the CI (element 524). In some embodiments, at least some of the cryptographic or security operations performed on behalf of the CI at the VTPM or VSD may be requested from the VMCs of the VS, and not necessarily from processes within the CI itself FIG. 6 is a flow diagram illustrating aspects of operations that may be performed in response to a request to replace a primary seed for a hierarchy of cryptographic operations of a compute instance, according to at least some embodiments. In the depicted embodiment, the kinds of cryptographic operation hierarchies introduced in FIG. 2 are assumed to be supported using a VTPM of a compute instance. Initial counter values for the different hierarchies, such as PHC, EHC, SHC and NHC, may be received at VMCs of a VCS similar in functionality to VCS 102 of FIG. 1 in the depicted embodiment (element 601). The VTPM and the CI with which the VTPM is associated may be launched at the VS.

Cryptographic operations of one or more hierarchies such as the hierarchies discussed in the context of FIG. 2 may be performed at the VTPM on behalf of the CI, e.g., in response to programmatic requests/commands from the CI and/or the VMCs (element 604). The operations performed may for example include generation of keys or other artifacts using primary seeds generated using the counter values, the BPS, the nonces and composing functions as discussed above.

An indication that a primary seed for a particular hierarchy H1 is to be replaced or modified may be obtained at the VTPM in the depicted embodiment (element 607). In some cases, the indication may comprise a command or request (e.g., a Change_PPS command for changing the primary seed for the platform hierarchy, a Change_EPS command for changing the primary seed for the endorsement hierarchy, a TPM_Clear command for changing the primary seed for the storage hierarchy), while in other cases, a signal that the CI has been or is going to be rebooted may serve as an indication that the primary seed for a hierarchy (e.g., the null hierarchy) is to be reset or modified. In response to such an indication, the counter value for that hierarchy may be updated in various embodiments, and the updated value may be stored in persistent storage (element 610). In some embodiments, the update may comprise adding an integer value j (modulo $2^k$ where the counter is expressed using k bits) to the current value of the counter. J may be set to 1 in some implementations for at least some of the counters. In some implementations, different values of j and/or k may be used for different counters. After the counter value has been updated, the new value and the nonce for the hierarchy may be utilized as input to the composing function CF to generate a new primary seed for H1, and the new primary seed may be used for cryptographic operations of H1 going forward (element 613) in at least some embodiments.

FIG. 7 is a flow diagram illustrating aspects of operations, associated with virtualized security devices, that may be performed as part of a migration of a compute instance from one virtualization server to another, according to at least some embodiments. As shown in element 701, a decision to migrate a compute instance CI1 with an associated VTPM VTPM1 from a source virtualization server VS1 to a destination virtualization server VS2 may be made at control plane resource of a VCS similar in functionality to VCS 102 of FIG. 1. The migration decision may be made, for example, in response to a migration request from a client on whose behalf CI1 was launched, or based on equipment maintenance or other maintenance reasons.

Instead of transmitting actual seed values (e.g., including primary seeds) for the different hierarchies of cryptographic operations supported by VTPM1, the base primary seed (BPS), the nonce values used for initializing/bootstrapping VTPM1, and the current counter values for the hierarchies may be transmitted to VS2 in the depicted embodiment (element 704). The current counter values (which may differ from the initial counter values used during the initialization of VTPM1, e.g., because of requests/command to reset primary seeds as discussed in the context of FIG. 6) may be transmitted directly from VS1 to VS2 in some embodiments using a secure communication channel, or may be transmitted via the CPNG in other embodiments. That is, in some embodiments, after a migration decision is made, the CPNG may retrieve the current counter values from VS1 and transfer them to VS2. In some embodiments, VSD initialization data sets VISD1 and VISD2 may be sent from the control plane to VS2, similar to those sent earlier to VS1 to initialize VTPM1, with the difference being that the counter values sent as part of VISD2 to VS2 may be the updated values obtained from VS1. Other state information (e.g., at least a portion of the contents of CI1's memory) may also be transmitted to VS2 in the depicted embodiment to enable CI1 to resume its operations where it left off on VS1. CI1's execution may be briefly paused for the migration, and VTPM1 may be terminated in at least some embodiments.

At VS2, a new VTPM process, VTPM2 may be started up using the transferred bootstrap information (including the BPS, nonce values and potentially updated counter values) (element 707). Primary seeds for various cryptographic hierarchies may be generated using the bootstrap information, in effect enabling VTPM2 to start up cryptographic computations from the state in which VTPM1 was immediately prior to the termination of VTPM1. The post-migration version of CI1 may be started up at VS2 and linked/associated with VTPM1. Subsequent cryptographic operations on behalf of CI1 may be performed using VTPM2 in the depicted embodiment (element 710).

It is noted that in various embodiments, some of the operations shown in FIG. FIG. 6, and/or FIG. 7 may be implemented in a different order than that shown in the figure, or may be performed in parallel rather than sequentially. Additionally, some of the operations shown in FIG. 5, FIG. 6, and/or FIG. 7 may not be required in one or more implementations.

Example VTPM Implementation Using Offloading Cards

Figure 8:
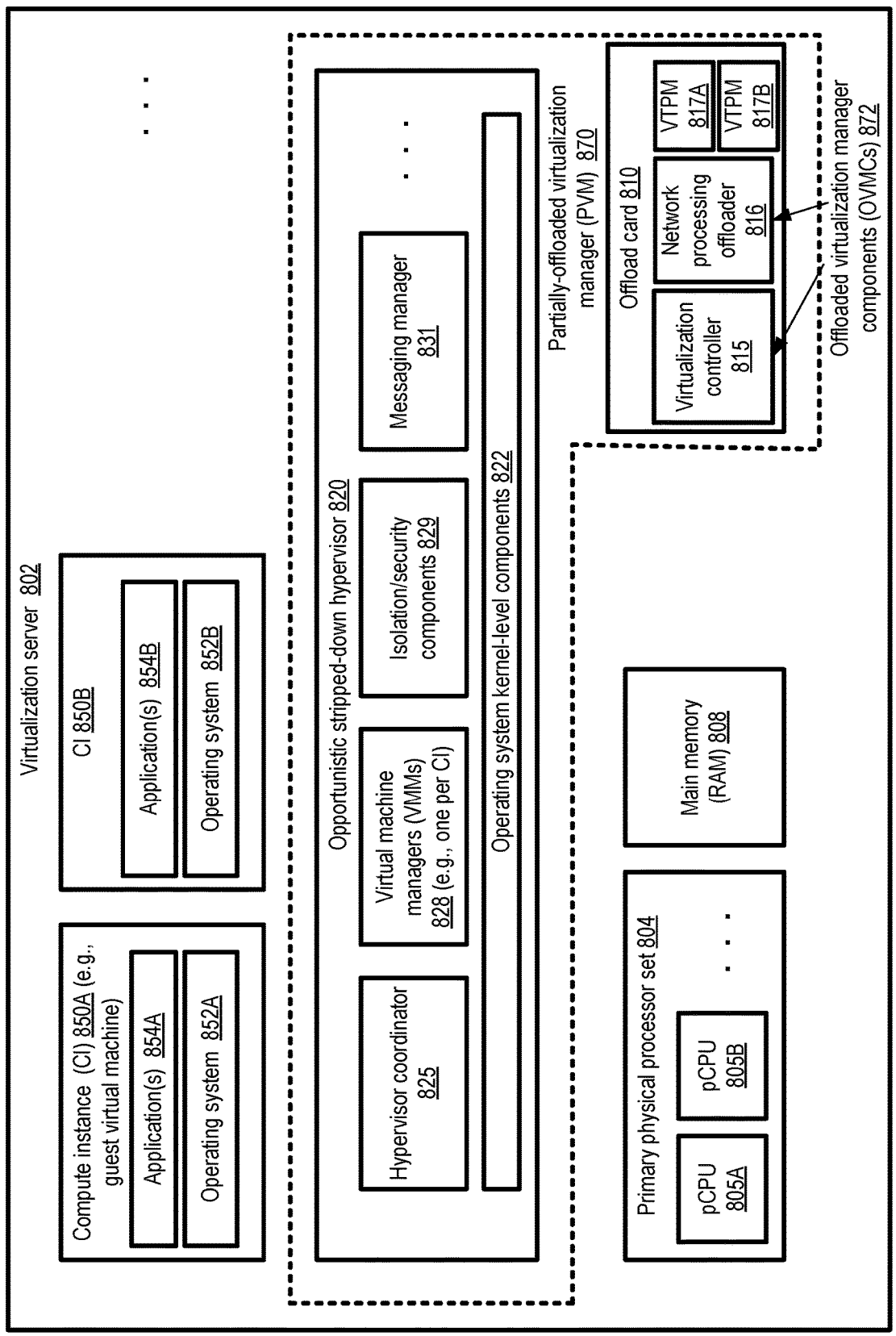
FIG. 8 illustrates an example virtualization server at which virtualized security devices may be instantiated at an offload card, according to at least some embodiments.

FIG. 8 illustrates an example virtualization server at which virtualized security devices may be instantiated at an offload card, according to at least some embodiments. As shown, a virtualization server 802 of a VCS similar in functionality to VCS 102 of FIG. 1 may comprise a primary physical processor set 804, a main memory (e.g., one or more modules of random access memory or RAM) 808, a partially-offloaded virtualization manager (PVM) 870 and zero or more compute instances (CIs) 850, such as CIs 850A and 850B in the depicted embodiment. A given CI may comprise, for example, a virtual machine referred to as a "guest" virtual machine. Virtualization server 802 may also comprise a number of other components, e.g., various persistent storage devices, which are not shown in FIG. 8. The primary physical processor set 804 may comprise a number of physical CPUs (pCPUs), including pCPUs 805A-805C in the depicted embodiment. Virtualized versions of the pCPUs, called vCPUs or virtual CPUs, may be allocated to individual CIs by the PVM 870 during the lifetime of the CIs. Each CI 850 may comprise a respective instance of an operation system (e.g., operating systems 852A or 852B) and a set of applications (e.g., 854A or 854B) being run on behalf of clients of the VCS.

The PVM 870 may comprise an opportunistic stripped-down hypervisor 820 (which uses the pCPUs) and one or more offloaded virtualization manager components (OVMCs) 872 which do not use the pCPUs in the depicted embodiment. OVMCs 872 may include, for example, a virtualization controller 815 and a network processing offloader 816. The offload card 810 at which the OVMCs are implemented may also include VTPMs such as VTPM 817A (configured for CI 850A) and VTPM 817B (configured for CI 850B) in the depicted embodiment. Individual ones of the OVMCs may be implemented using a respective system-on-chip design in some embodiments. Although both OVMCs 872 and the VTPMs are shown as being incorporated within a single offload card 810 (e.g., a PCIe card) in the depicted embodiment, other approaches regarding the arrangement and organization of the OVMCs and/or VTPMs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 815 and the network processing offloader 816. In some embodiments the VTPMs may be launched at a different offload card than the virtualization controller and/or the network processing offloader. The virtualization controller, as suggested by its name, may be responsible for organizing or orchestrating much of the virtualization management work performed at the VS 802 in the depicted embodiment—e.g., it may be the first of the components of the PVM to boot, trigger the launches of the other components of the PVM, communicate with the VCS control plane, make memory allocation decisions with respect to CIs, and so on. The network processing offloader 816 may be responsible for implementing one or more networking protocols (including for example an encapsulation protocol used within the VCS) and acting as an intermediary between the CIs and networking endpoints outside the VS in the depicted embodiment.

Hypervisor 820 may be described as being stripped-down in the depicted embodiment because much of the work performed by at least some conventional hypervisors may be handled by the OVMCs 872 instead, thereby reducing the complexity and size of the hypervisor 820. In addition, hypervisor 820 may be designated as opportunistic because, under most circumstances, it may wait until a CI voluntarily relinquishes control of a pCPU 805 before the hypervisor uses pCPU cycles. As such, the hypervisor 820 may have a minimal impact on the performance of applications 854 in the depicted embodiment. Running the VTPMs 817 at the offloading card 810 (e.g., instead of using the pCPUs for the VTPM operations) may also reduce the impact of security related computations on the performance of applications 854 in various embodiments.

The hypervisor 820 may itself comprise a number of subcomponents in the depicted embodiment, including a set of operating system kernel-level components 822, a hypervisor coordinator 825, one or more virtual machine managers (VMMs) 828, isolation/security components 829, and/or a messaging manager 831. The hypervisor coordinator 825, individual ones of the VMMs 828, the isolation/security components 829 and/or the messaging manager 831 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by CIs, etc.). In some implementations, for example, several of the hypervisor subcomponents may typically remain blocked on a polling system call (such as epoll( ) or the equivalent) most of the time.

The kernel-level components 822 may provide support for various low-level operations such as the initial responses to VM exit instructions issued by the CIs (e.g., when a CI gives up a pCPU). The hypervisor coordinator 825, as implied by the name, may be responsible for orchestrating operations of the other subcomponents. The hypervisor coordinator 825 may, for example, implement an API which can be used for communications between the OVMCs 872 and the hypervisor, initiating CI launches and terminations (e.g., at the request of an OVMC), exposing metrics collected by the VMMs, providing debugging capabilities, and so on.

Each VMM 828 may be responsible for launching or instantiating a respective CI based on a specification provided by the coordinator 825, monitoring metrics and logs of the CI, and so on. In some embodiments a VMM 828 may also help with CI-requested I/O operations for certain devices, e.g., by trapping I/O requests and translating them to memory-mapped I/O operations completed with the help of an OVMC. In some embodiments there may be a 1-to-1 mapping between VMMs and CIs, while in other embodiments a single VMM may be responsible for multiple CIs.

The messaging manager 831 may act as an intermediary between the virtualization controller 815 and the hypervisor, e.g., by translating commands issued using a queue-based protocol by the virtualization controller into pipe messages within the hypervisor. The security and isolation components 829 may be responsible, for example, for scrubbing or cleaning up memory when a CI terminates, so that inadvertent sharing of data across CIs can be avoided. In at least some embodiments the isolation/security components 829 may be responsible for receiving and decrypting VIDS1 and VIDS2 to be used to start the VTPMs 817, requesting the launch of the VTPMs, and/or other VTPM related operations. In other embodiments, the virtualization controller 815 may be responsible for launching VTPMs, initiating VTPM bootstrap operations, communicating with the CPSG and CPNG associated with a given VTPM, and so on. It is noted that the PVM may comprise additional components (not shown in FIG. 8) in at least some embodiments, while in at least one embodiment one or more of the PVM components shown in FIG. 8 may not be required.

An offload card 810 may comprise one or more systems-on-chip (SOCs) with respective sets of offloading processors (as distinguished from the primary pCPUs of the virtualization server) in some embodiments. One of the SOCs may be used for the virtualization controller and/or the VTPMs 817 in some embodiments, while another may be used for the network processing offloader. In some embodiments an offload card may also incorporate a physical TPM which may be used during the boot of the VS 802 itself (as opposed to being used for security operations associated with individual CIs, which may be handled using the VTPMs). In addition, an offload card 810 may comprise a number of storage, power and connectivity-related components in various embodiments.

Example Programmatic Interactions

Figure 9:
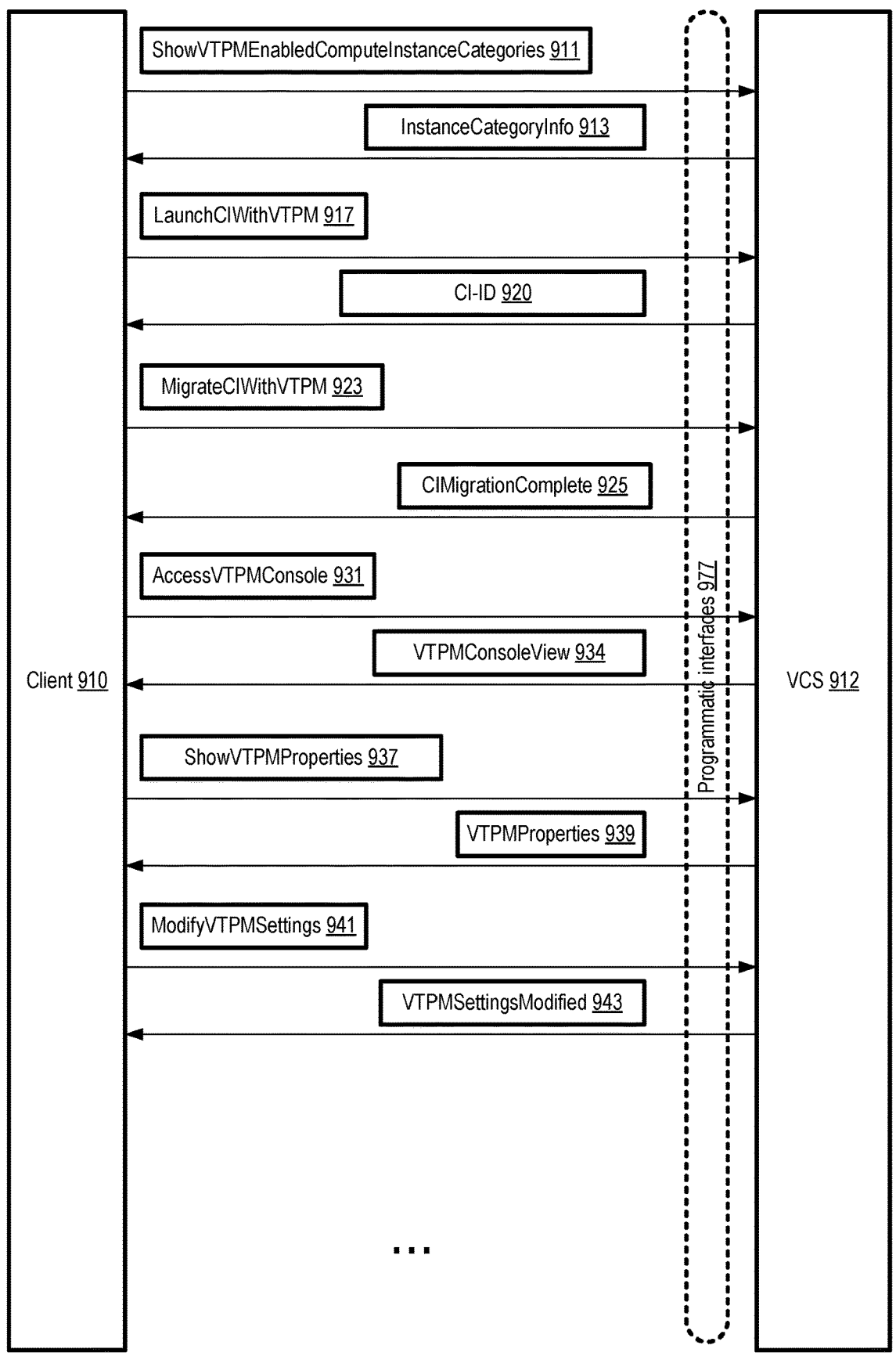
FIG. 9 illustrates example programmatic interactions between clients and a virtualized computing service, pertaining to the use of virtualized security devices at compute instance, according to at least some embodiments.

FIG. 9 illustrates example programmatic interactions between clients and a virtualized computing service, pertaining to the use of virtualized security devices at compute instance, according to at least some embodiments. A VCS 912, similar in functionality to VCS 102 of FIG. 1, may implement a set of programmatic interfaces 977 in the depicted embodiment, comprising for example one or more web-based consoles, command line interfaces, graphical user interfaces and the like, which may be used by clients 910 to submit messages and requests pertaining to the use of VTPMs or VSDs in the depicted embodiment.

In some embodiments, a VCS 912 may allow clients to select from among several different types or categories of compute instances, including for example compute-optimized CIs with large amounts of computing capacity available per CI, large-memory-oriented CIS for applications which require more memory relative to computing capacity, large-storage-oriented CIs for applications which require substantial persistent storage, and/or VTPM-enabled CIs for applications requiring extensive use of security-related computations. A client may view the properties or characteristics of the different categories prior to selecting a particular CI type in the depicted embodiment. For example, a client 910 may submit a ShowVTPMEnabledComputeInstanceCategories request 911, and receive information in an InstanceCategoryInfo response message 913 about the kinds of VTPM-enabled CIs that can be acquired from the VCS. In an embodiment in which multiple VTPM-enabled CI categories are supported at the VCS, the VTPM-enabled categories may differ from one another along dimensions such as the particular TCG specification with which the categories are compliant, whether the VTPMs utilize processors at offload cards similar to those shown in FIG. 8 or the primary CPUs of the VSs, the computing/memory/storage capacities of the CIs, and so on.

A client may request the launch of a VTPM-enabled CI of a selected category by submitting a LaunchCIWithVTPM request 917 in the depicted embodiment. Receipt of such a request may trigger the initiation of a pre-launch procedure similar to that discussed earlier (e.g., in the context of FIG. 3 and FIG. 5). A CI-ID message 920 comprising an identifier of the launched CI may be transmitted to the client in some embodiments after the CI and its VTPM have been launched and initialized.

According to some embodiments, a client 910 may submit a request to migrate a CI with an associated VTPM, e.g., in a MigrateCIWithVTPM message 923, specifying for example the CI to be migrated, as well as desired properties of a destination VS to which the CI should be migrated. For example, a client may wish to move the CI to a location where it will be closer (e.g., in terms of physical distance and/or network hops) to another CI being used for a latency-sensitive application, and an identifier of the other CI may be provided to enable the migration destination VS to be chosen accordingly. After a migration procedure similar to that discussed earlier (e.g., in the context of FIG. 7) is performed and the CI has successfully been started up at the destination VS (along with a VTPM initialized using the counters which were potentially updated at the source VS), a CIMigrationComplete message 925 may be sent to the client in some embodiments.

In at least one embodiment, the VCS may provide a VTPM console (e.g., a graphical user interface designed for simplifying VTPM-related administrative tasks) enabling a client on whose behalf a VTPM-enabled CI is set up to view and/or modify properties of a given VTPM. An AccessVTPMConsole request 931 may be submitted by a client 910 to request use of the VTPM console in the depicted embodiment. In response a VTPMConsoleView message 934 may present the VTPM console to the client. A ShowVTPMProperties message 937 may be submitted in some embodiments by a client (e.g., via the VTPM console, or independently of the VTPM console) to, for example, determine the current status of the VTPM, statistics such as the number of keys that have been requested from the VTPM over some specified time interval, and so on. The requested VTPM properties may be provided in one or more VTPM-Properties messages 939 in the depicted embodiment. In some embodiments, a client 910 may request modification of one or more VTPM settings by submitting a ModifyVTPMSettings request 941. For example, such a request may be used to request reset or modification of a primary seed corresponding to one of the cryptographic operation hierarchies discussed earlier. The requested modifications may be performed if permitted, and a VTPMSettingsModified response message 943 may be sent to the client in at least some embodiments. In some embodiments, VTPM-related programmatic interactions other than those shown in FIG. 9 may be supported by VCS 912.

Illustrative Computer System

Figure 10:
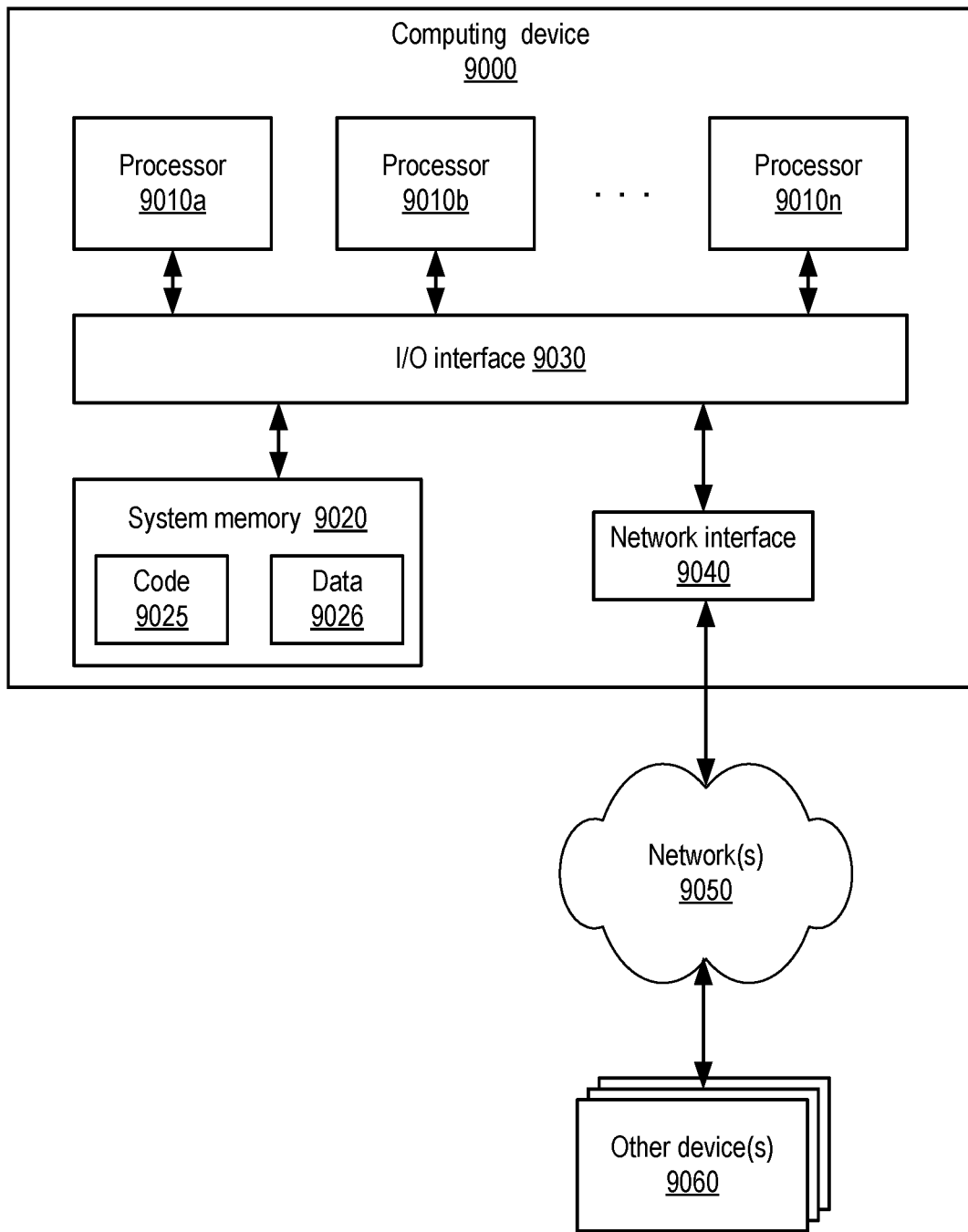
FIG. 10 is a block diagram illustrating an example computing device that may be used in at least some embodiments.

In at least some embodiments, a server that implements the types of techniques described herein (e.g., various functions of a VCS, including VTPM-related functions), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
transmit, prior to a launch of a compute instance at a first virtualization server of a virtualized computing service: (a) an entropy source value from a first isolated control plane component of the virtualized computing service to one or more virtualization management components of the first virtualization server and (b) a nonce and a first counter value from a second isolated control plane component of the virtualized computing service to the one or more virtualization management components of the first virtualization server, wherein the entropy source value is not accessible to the second isolated control plane component, and wherein the nonce and the first counter value are not accessible to the first isolated control plane component;
store an updated counter value at a storage device associated with the first virtualization server after performing one or more cryptographic operations at the first virtualization server, wherein the updated counter value is obtained from the first counter value, wherein the one or more cryptographic operations include generation of a particular cryptographic key utilized at the compute instance, wherein the particular cryptographic key is generated by a first virtualized Trusted Platform Module (VTPM) assigned to the compute instance and initialized at the first virtualization server, and wherein the first VTPM is initialized using at least the entropy source value, the nonce and the first counter value; and
perform, at a second virtualization server selected as a migration destination for the compute instance, one or more additional cryptographic operations after the compute instance is migrated to the second virtualization server, wherein the one or more additional cryptographic operations include generation of another cryptographic key used at the compute instance, wherein the other cryptographic key is generated by a second VTPM assigned to the compute instance and initialized at the second virtualization server, and wherein the second VTPM is initialized using at least the entropy source value, the nonce and the updated counter value.

2. The system as recited in claim 1, wherein the updated counter value is generated, using the first counter value, in response to a command issued at the first virtualization server.

3. The system as recited in claim 1, wherein the updated counter value is generated from the first counter value in response to a reboot of the compute instance at the first virtualization server.

4. The system as recited in claim 1, wherein the one or more computing devices include further instructions that upon execution on or across the one or more computing devices further cause the one or more computing devices to:
compute, during initialization of the first VTPM at the first virtualization server, using at least the entropy source value, the nonce and the first counter value, a primary seed for a hierarchy of cryptographic operations defined in a Trusted Computing Group (TCG) standard, wherein the particular cryptographic key is generated using the primary seed.

5. The system as recited in claim 1, wherein the one or more computing devices include further instructions that upon execution on or across the one or more computing devices further cause the one or more computing devices to:
launch, at the first virtualization server, a third virtualized security device for a second compute instance instantiated at the first virtualization server.

6. A computer-implemented method, comprising:
obtaining, at a first virtualization server prior to a launch of a compute instance, (a) an entropy source value from a first control plane component of a virtualized computing service, and (b) a first counter value from a second control plane component of the virtualized computing service;
updating the first counter value to a second counter value after performing one or more cryptographic operations at the first virtualization server, wherein the one or more cryptographic operations include generating a particular security artifact used at the compute instance, wherein the particular security artifact is generated by a first virtualized security device configured at the first virtualization server and associated with the compute instance, wherein the first virtualized security device is configured using at least the entropy source value and the first counter value; and
performing one or more additional cryptographic operations at a second virtualization server to which the compute instance has been migrated from the first virtualization server, wherein the one or more additional cryptographic operations include including generating another security artifact which is used by the compute instance, wherein the other security artifact is generated by a second virtualized security device configured at the second virtualization server, and wherein the second virtualized security device is configured using at least the entropy source value and the second counter value.

7. The computer-implemented method as recited in claim 6, wherein the first virtualized security device comprises one or more processes, the computer-implemented method further comprising:
instantiating, by a virtualization management component of the first virtualization server, the one or more processes after the entropy source value and the first counter value have been received at the first virtualization server.

8. The computer-implemented method as recited in claim 6, wherein the first virtualized security device comprises one or more threads launched at a virtualization management offloading card of the first virtualization server.

9. The computer-implemented method as recited in claim 6, further comprising:
determining, at the first control plane component, the entropy source value by applying a mapping function to an instance identifier of the compute instance prior to a launch of the compute instance.

10. The computer-implemented method as recited in claim 6, further comprising:
determining, at the second control plane component, a nonce by applying a mapping function to identification information of a client at whose request the compute instance is launched at the first virtualization server, wherein the first virtualized security device is configured using at least the nonce.

11. The computer-implemented method as recited in claim 6, further comprising:
computing, by the first virtualized security device at the first virtualization server using at least the entropy source value and the first counter value, a primary seed for a hierarchy of cryptographic operations defined in a Trusted Computing Group (TCG) standard, wherein the hierarchy comprises a member of a set of hierarchies which includes (a) a platform hierarchy, (b) an endorsement hierarchy, (c) a storage hierarchy, or (d) a null hierarchy, wherein the particular security artifact is generated using the primary seed.

12. The computer-implemented method as recited in claim 6, further comprising:
obtaining the second counter value at the second control plane component from the first virtualization server; and
transmitting the second counter value from the second control plane component to the second virtualization server.

13. The computer-implemented method as recited in claim 6, further comprising:
transmitting the second counter value from the first virtualization server to the second virtualization server without using the second control plane component as an intermediary.

14. The computer-implemented method as recited in claim 6, wherein the first counter value is updated to the second counter value in response to a command issued at the first virtualization server.

15. The computer-implemented method as recited in claim 6, wherein the first counter value is updated to the second counter value in response to a reboot of the compute instance at the first virtualization server.

16. One or more non-transitory computer-accessible storage media storing program instructions that when executed on or across one or more processors cause the one or more processors to:
obtain, at a first virtualization server prior to a launch of a compute instance, (a) a first virtualized security device initialization data set from a first source, and (b) a second virtualized security device initialization data set from a second source;

modify, after performing one or more cryptographic operations at the first virtualization server, a value of a data item included in the second virtualized security device initialization data set, wherein the one or more cryptographic operations include generating a particular cryptographic artifact used by the compute instance, wherein the particular cryptographic artifact is generated by a first virtualized security device initialized at the first virtualization server using the first virtualized security device initialization data set and the second virtualized security device initialization data set; and perform one or more additional cryptographic operations at a second virtualization server to which the compute instance has been migrated from the first virtualization server, wherein the one or more additional cryptographic operations include including generating another cryptographic artifact used by the compute instance, wherein the other cryptographic artifact is generated by a second virtualized security device instantiated at the second virtualization server, and wherein the second virtualized security device is initialized using at least the modified value of the data item.

17. The one or more non-transitory computer-accessible storage media as recited in claim 16, storing further program instructions that when executed on or across one or more processors further cause the one or more processors to:
obtain, via one or more programmatic interfaces of a virtualized computing service, a request to launch a compute instance; and
generate, at the first source, the first virtualized security device based at least in part on the request to launch the compute instance.

18. The one or more non-transitory computer-accessible storage media as recited in claim 16, storing further program instructions that when executed on or across one or more processors further cause the one or more processors to:
initialize, at the first virtualization server, a third virtualized security device for a second compute instance instantiated at the first virtualization server.

19. The one or more non-transitory computer-accessible storage media as recited in claim 16, wherein the value of the data item is modified in response to a command issued at the first virtualization server.

20. The one or more non-transitory computer-accessible storage media as recited in claim 16, wherein value of the data item is modified in response to a reboot of the compute instance at the first virtualization server.

* * * * *